UNITED STATES PATENT OFFICE.

HAJIME NAGASHIMA, OF TAPANEE, NANSHINSENKEI SAIRI, TAINAN, FORMOSA, ASSIGNOR TO TAINAN SEITO KABUSHIKI KAISHA, OF TOKYO, JAPAN.

PROCESS OF MANUFACTURING SULFID DYE FROM FILTER-CAKES OF SUGAR-JUICE.

1,308,552.      Specification of Letters Patent.      Patented July 1, 1919.

No Drawing.      Application filed October 9, 1917. Serial No. 195,649.

*To all whom it may concern:*

Be it known that I, HAJIME NAGASHIMA, subject of the Emperor of Japan, residing at Tapanee, Nanshinsenkei Sairi, Tainan, Formosa, have invented new and useful Improvements in Processes of Manufacturing Sulfid Dye from Filter-Cakes of Sugar-Juice, of which the following is a specification.

This invention relates to a process of manufacturing a sulfid dye from filter cakes of sugar factories, and consists first in heating such cakes, adding thereto hydrochloric acid, nitric acid or the like, thus dissolving the lime contained therein, and then after washing it with water, again heating it and adding thereto either caustic alkali and sulfur, or polysulfid of an alkali metal. The object of my invention is to utilize the heretofore useless filter cakes of sugar factories and to obtain therefrom cheaply and with simple work a permanent dye-stuff by removing the lime contained therein.

The following is an example of carrying my invention into practice:—

1. *Extraction of lime.*—Powder in a mortar, or by a roller if necessary, filter cakes which remain when heated juice of sugar cane has been filtered by adding thereto lime, lime salt, or any such defecating agent, and knead the same into a homogeneous paste. Put this paste in a wooden tub or cask, add thereto nitric acid, and heat it by means of steam until the boiling point is reached. Then stop the steam but allow chemical change to continue and dissolve the lime. The quantity of the acid to be added must not be more than is necessary to neutralize the alkali contained in the filter cake, otherwise the material itself will become soluble, and a great difficulty will be encountered in washing and filtering it. The use of nitric acid, moreover, makes the work of filtering, washing and sulfurating easy, and it gives a product of good quality. The filtering is made easy because the nitrogenous matters contained in the filter cake are coagulated by the nitric acid, and the sulfurating is made easy and a product of good quality is obtained, because organic compounds having nitric or nitrous base are formed.

2. *Filtering and washing.*—To filter and wash the pasty substance boiled together with an acid, there is no need of using any filtering apparatus. If the paste is put in a bag of linen or cotton and if the bag is left suspending, the weight of the paste itself will squeeze out the water. The washing too is not required to be thorough, as what small quantity of acid remaining will be neutralized in the succeeding operation.

3. *Sulfurating operation.*—Mix powdered sulfur and caustic soda with the paste from which the water is squeezed out as far as possible (the paste still containing water of 40 to 50%), and dry the mixture in a flat pan stirring it all the time until it becomes grains. Powder these grains by any suitable means and heat the powdered mixture again keeping the sulfur in melted condition. Then raise the heat further and volatilize the surplus sulfur. If the process of sulfurating is carried on in an air tight apparatus instead of in a flat pan, the quantity of sulfur used may be economized.

In this invention, in order to extract lime hydrochloric acid may be used instead of nitric acid, or hydrochloric acid may be first used and then the material may be treated with nitric acid. Again, in the sulfurating process, the filter cakes may be mixed with powdered sulfur, and after drying this mixture, caustic alkali may be added; or the pasty substance may be first dissolved with caustic alkali and then sulfur added thereto; or a polysulfid of an alkali metal may be utilized and used in place of sulfur and caustic alkali, any of the above operations attaining the same object.

In this invention, filter cakes of juice of sugar cane are first mechanically broken by crushers, pressure rolls, or the like. It then acquires a condition in which it can easily be sulfurated. Moreover, the formation of substances such as calcium sulfid which is very injurious to color, is prevented when lime is extracted by boiling the substance in an organic acid. Thus the desired color can be obtained very economically and by a very simple process. The yield too is very high.

Having now particularly described my said invention, what I claim and desire to have protected by Letters Patent is as follows:—

1. A process of manufacturing a sulfid dye-stuff from filter cakes of juice of sugar cane consisting in extracting lime from such cakes by boiling same in an inorganic acid and washing away the lime salt produced with water; and then in heating the same after adding thereto sulfur and an alkali, substantially as and for the purposes hereinbefore set forth.

2. A process of manufacturing a sulfid dye-stuff from filter cakes of the juice of sugar cane which consists in adding to the cakes an acid to neutralize the alkali in the cakes, dissolving the lime contained therein, and then adding sulfur and alkali.

3. A process of manufacturing a sulfid dye-stuff from filter cakes of the juice of sugar cane which consists in boiling the cakes in nitric acid, adding thereto sulfur and caustic soda, and then heating the mixture.

4. A process of manufacturing a sulfid dye-stuff from filter cakes of the juice of sugar cane which consists in boiling the cakes in an inorganic acid and washing away the lime salt, and then heating the same after adding thereto sulfur and a polysulfid of an alkali metal.

In testimony whereof I have signed my name to this specification.

HAJIME NAGASHIMA.

Witnesses:
 YOSHIKA IKEDA,
 H. F. HAWLEY.